United States Patent [19]

Puskar

[11] Patent Number: 4,489,109

[45] Date of Patent: Dec. 18, 1984

[54] PROCESS FOR APPLYING LATEX RUBBER COATINGS TO ASBESTOS-CEMENT PRODUCTS

[75] Inventor: Victor Puskar, Basking Ridge, N.J.

[73] Assignee: ASARCO Incorporated, New York, N.Y.

[21] Appl. No.: 448,482

[22] Filed: Dec. 10, 1982

[51] Int. Cl.³ .............................................. B05D 7/22
[52] U.S. Cl. ................................... 427/230; 264/129; 264/133; 264/236; 264/333; 264/336; 427/236; 427/238; 427/374.1; 427/393.6; 428/36
[58] Field of Search ................ 427/230, 374.1, 393.6, 427/379, 238, 236, 231, 377, 370; 264/129, 133, 236, 333, 336; 428/36

[56] References Cited

U.S. PATENT DOCUMENTS

| | | | |
|---|---|---|---|
| 2,201,840 | 5/1940 | Venable | 427/393.6 |
| 2,317,487 | 4/1943 | Schuelke | 427/393.6 |
| 2,496,895 | 2/1950 | Staley | 264/133 |
| 2,716,619 | 8/1955 | Jobbins et al. | 427/393.6 |
| 3,027,294 | 3/1962 | Bettoli et al. | 264/133 |
| 3,097,990 | 7/1963 | Holly | 427/393.6 |
| 3,271,236 | 9/1966 | Badie | 264/336 |
| 3,491,174 | 1/1970 | Hamme et al. | 264/129 |
| 3,549,737 | 12/1970 | Schulze | 264/333 |
| 3,767,746 | 10/1973 | Earle et al. | 264/333 |

Primary Examiner—Sadie L. Childs
Attorney, Agent, or Firm—John J. Tomaszewski; Kenneth A. Koch

[57] ABSTRACT

A process for the production of a vulcanized latex protective coating bonded to the surface of an asbestos-cement article, particularly a pipe, is disclosed. The process includes a step whereby the latex coating is applied before autoclaving to the article, and becomes a hard, protective bonded layer during the autoclaving process.

12 Claims, No Drawings

PROCESS FOR APPLYING LATEX RUBBER COATINGS TO ASBESTOS-CEMENT PRODUCTS

DESCRIPTION OF THE INVENTION

This invention is related to protective coated asbestos-cement products, and more particularly, to a protective cured latex rubber coating and accompanying coating method for asbestos-cement pipe.

Asbestos-cement (a/c) pressure pipe has found extensive use, particularly in the transportation of fluids such as drinking water. However, it is vulnerable to slow leaching by the fluid with a subsequent release of asbestos fibers into the fluid.

As a general rule, soft, low pH waters will attack the a/c pipe, leading to a gradual erosion of the pipe, with the release of asbestos fibers. Hard, alkaline pH waters, however, deposit a thin mineral coating on the pipe surface, thus preventing the escape of these fibers.

The agressive index, (AI), which takes into account the pH, alkalinity and hardness, is an often used indicator of the suitability of a/c pipe for a particular type water. The aggressive index is defined as:

$$AI = pH + \log(AH),$$

where
pH = index of acidity or alkalinity in standard units
A = total alkalinity in ppm $CaCO_3$
H = calcium hardness in ppm $CaCO_3$.

The aggressive index was derived from Langelier's saturation index for calcium carbonate, which predicts the ability of the transported water to precipitate or dissolve calcium carbonate. In general, an AI of less than 10.0 describes a highly aggressive water, whereas an AI greater than 12.0 is typical of a nonaggressive drinking water, with AI's between 10.0-12.0 indicating a moderately aggressive water.

In numerous instances, however, a/c pipe has been highly effective in transporting waters categorized as highly aggressive. The reason for this is partly because minute quantities of dissolved iron, zinc, manganese or silica can deposit and form coatings on the pipe surface, and the Agressive Index does not take into account the presence of these natural corrosion inhibitors in the water.

The prior art has not been content to rely on the uncertain effects of such deposited coatings, and has experimented with several kinds of coatings for a/c pipes. Bitument has been the most widely used coating material, and has proven effective as a long lasting protective coating on some a/c pipes. However, bitumen coated pipes impart an undesirable odor and taste to the water, particularly during the initial years of service. Coatings containing epoxy and mixtures of coal tar and epoxy have also been applied to a/c pipes, and have proven to be particularly wear resistant. However, such coatings also have their flaws, and are extremely expensive, increasing the cost of the pipe by 30% or more. Additionally, certain resin based coatings have proven to be toxic, introducing chemicals such as tetrachloroethylene into the water. This is because such coatings usually require a surface etching by an acid or another solvent before application of the coating. It has recently been discovered that a large number of organic compounds, including polynuclear aromatic compounds (PAC's) which are known or suspected carcinogens, are released from coal tar coatings into the water, and thus such coatings are not suitable alternatives.

Modern protective coatings thus do provide protection to a/c pipe, even in aggressive waters, but are unsatisfactory as potential health hazards, odor and taste imparters to the fluid, and an uneconomical. Consequently, there exists a need for an effective, environmentally safe, low cost coating for a/c pipe. For these reasons, only about 2% of the a/c pipe in service in North America today is lined.

Latex is a colloidal aqueous emulsion of an elastomer. Naturally occurring latex is obtained from the Hevea brasiliensis rubber tree, which are cultivated mostly in Southeast Asia, and consists primarily of polyisoprene. Each individual latex particle, usually ranging about 0.1-0.2 microns in size, is composed of a rubber hydrocarbon having a complex surface layer of proteins, fatty acids and sugars. The rubber content of natural latex ranges from about 20-30 wt %, and can be concentrated, usually by the well known techniques of centrifuging or creaming, to a rubber content of 60-70%.

Synthetic rubbers and latexes, in contast, are produced by polymerization processes, most latexes being manufactured by emulsion polymerization. Synthetic latexes are usually produced from a mixture of two types of monomers; for example, styrene-butadiene latex is produced from a copolymerization of styrene and butadiene monomers. Polymerization conditions can be varied over a wide range of conditions, particularly in the control of temperature, additives, etc. Latex particles in aqueous solutions become negatively charged. A stabilizer is then added in order to prevent the particles from coagulating.

In addition to their chemical composition, latexes can be classified into several other categories, such as saturated or unsaturated, depending upon the particular type of carbon-hydrogen bonding they display. Unsaturated latexes can be vulcanized with sulfur bearing agents, whereas saturated latexes cannot. Since any product manufactured from a plain latex will have inferior mechanical characteristics, the latex is always used in conjunction with any of several compounding agents. One of the most important compounding ingredients is sulfur. When a mixture of latex and sulfur is heated to about 300° F., sulfur will react with the polymer and cause cross-linking of the latex molecules. The amount of sulfur added in these vulcanization processes can vary greatly, ranging from about 2-35 parts per hundred parts latex, depending on the particular product being manufactured and the degree of hardness desired. Other cross-linking agents have been developed in recent years, but sulfur is still the most commonly used. Accelerating agents such as zinc oxide can significantly reduce the vulcanization curing time.

Heat, ozone, oxygen and sunlight will attack rubber, and a prolonged exposure thereto can result in the deterioration of the rubber product within a relatively short time. In order to prevent such a product failure through oxidative destruction, antioxidants are added to the latex. These compounds provide protection from oxidation by eliminating peroxides and hydroperoxides, whose presence can damage the rubber. A large number of antioxidants are available for rubber compounding, with wide variations in their chemical composition, molecular weight, volatility, etc.

Fillers are also frequently present in rubber and latex products. Such fillers when incorporated into latex products, in contrast to their inclusion in solid rubber products where fillers usually enhance such mechanical properties as tensile strength, usually do not improve the properties, but are added primarily for cost reduction. Common fillers include carbon black, calcium silicates, precipitated calcium carbonate, silica, clay, magnesium carbonate, zinc oxide, and the like.

It is an object of this invention to develop an effective, economical protective coating for asbestos cement products that is resistant to leaching from waters and will be free from carcinogenic substances that can release into the water.

It is a further object of this invention to develop an a/c pipe coating which does not impart any odor or taste to the transported fluid.

It is still another object of the invention to develop a process for the production of latex coated a/c pipe that is efficient, economical, and easily incorporated into the industrial production of a/c pipe.

SUMMARY OF THE INVENTION

Accordingly, these and other objects of the invention are attained by the development of a novel process for the production of a/c products, and particularly a/c pipe useful for the transportation of fluids, particularly drinking water, comprising forming an a/c product from an aqueous slurry of asbestos fibers, cement and silica around a mandrel of predetermined dimension or, in the broadest embodiment, a means for forming a product of predetermined dimension, separating the formed a/c pipe from the mandrel, most preferably after an initial precuring step then preferably precuring the pipe again at a second predetermined temperature, preferably about 150° to 250° F., for a predetermined time, preferably 2 to 4 hours; coating the pipe with a latex composition, preferably a composition containing an unsaturated styrene-butadiene based latex, and which also preferably includes sulfur, or another suitable vulcanizing agent, an antioxidant and a filler, to a predetermined thickness, preferably about 2-20 mils, and most preferably about 3-6 mils; autoclaving the coated pipe for a predetermined time, preferably about 8 to 16 hours at a predetermined pressure, preferably about 120 to 160 psi and about 340° to 365° F.; whereupon the latex rubber coating becomes both vulcanized and bonded to the a/c pipe; cooling the processed pipe to a predetermined, i.e., room, temperature.

The invention also comprises a novel asbestos-cement coated product, most commonly a pipe particularly useful in the transportation of fluids, particularly drinking water, which should be transported to a location arriving substantially free from foreign substances, particularly carcinogenic substances; comprising an asbestos-cement pipe having bonded thereto a thin protective coating comprising a rubber latex, preferably an unsaturated styrene-butadiene latex, an antioxidant, a vulcanizing agent, preferably sulfur, and a filler; the coating forming a hard, protective, corrosion resistant, fluid contacting layer which substantially prevents the asbestos fibers as well as other substances present from entry into the transported fluid.

DETAILED DESCRIPTION OF THE INVENTION

The search for an effective protective coating for asbestos-cement products has been a long and difficult one, as such coatings must overcome a variety of rigorous specifications. A/c pipes in particular posses many desirable properties, e.g., strength, long life, are relatively inexpensive, and thus are a desirable element in conduits which transport a variety of fluids, such as drinking water. However, a/c pipes frequently start to erode after long contact with a fluid, with asbestos particles together with other constituents of the pipe mass gradually seeping into the transported fluid after a period of time. Although asbestos surprisingly is believed to be harmless if ingested, there is still the psychological and public relations aspects of the problem, as well as the additional release of other potential carcinogens into the fluid. Additionally, the protective coating should not impart a taste or odor to the fluid, particularly in the case of drinking water, and must be cost competitive. Also, the coating process should be easily and efficiently incorporated into the pipe production process.

Surprisingly, the above requirements have been met by the discovery of a new and improved process for the production of a coated a/c pipe, and the resulting product itself. Broadly, the invention encompasses an a/c product produced by incorporating a novel coating process into the product producing operation, whereby a thin latex coating is applied to the a/c article, i.e., pipe before, instead of after, the pipe is autoclaved. During the subsequent autoclaving process, the latex becomes both vulcanized into a hard rubber protective coating, and also becomes securely bonded to the a/c pipe.

The present invention is eminently well suited for asbestos-cement slurries wherein the asbestos fiber is that normally found in the Province of Quebec, Canada, especially chrysotile fiber found in the Province. However, the invention can also be practiced on other asbestos fiber as exemplified by amosite, crocidolite, anthrophyllite, tremolite and actinolite.

In the production of the a/c products, the aqueous slurry can be formed of hydraulic cement, for instance Portland cement, with or without silica, and the product asbestos fiber, for example product chrysotile asbestos fibers of this invention composed of a preferably dry fiber coated with filtration improvers, such as aluminum sulfate and the like. A water-laid web is formed from the a/c fiber slurry by filtering off a major portion of the water of the slurry so that the fiber and cement are deposited to form a continuous solid wet sheet on a formanous surface such as, for example, a water absorbent felt, a moving screen, or a screen-covered perforated cylinder under a partial vacuum. The web thus formed is usually further consolidated and dewatered by applying a partial vacuum to suction rolls or felts or by pressure rolls as the web advances through the machine. Although the coating to be applied is most often destined to form an a/c pipe, the a/c water-laid products preparable in accordance with this invention are exemplified by sheets, boards, shingles, panels, clapboards, corrugated siding and roofing sheets, tubing, and other products including various special shapes and forms of the material.

After formation of the particular shape desired by a means for forming a product of predetermined dimension, in the most common case of a pipe by using a mandrel having a predetermined diameter, the formed product is then preferably, but not critically, subjected to at least one, and most preferably, two precuring stages before the autoclaving process is started. It is critical that the latex coating be applied to the a/c surface before the initiation of autoclaving, the precise point, however, is not critical. In many industrial a/c pipe forming processes there are two precuring steps, one occurring for a short time at a predetermined temperature during the actual pipe formation process while the pipe is still on the mandrel, and the second, and usually longer precuring taking place after the extraction of the mandrel but before autoclaving. It is not clear which particular sequence leads to an optimization of the process; however, it is hypothesized that the latex coating should be applied to the a/c pipe immediately after extraction from the mandrel, but before secondary curing. This process is thought would minimize evaporation (drying) during precuring and would potentially result in a stronger pipe. The pipes in an industrial operation are usually transported to and from the precuring ovens by conveyor belts, and the entire precuring operation can vary widely, usually between 1-5 hours at temperatures of 150°-250° F. It is preferred that the coating process take place before the pipes have cooled back to about the temperature of the surrounding environment. Treating the a/c pipe with the latex coating can take place by any one of a number of methods known to those in the art, for example, spray nozzles, paint rollers, dipping and the like. The preferred method used to coat the interior pipe surface is to engage a "spinner" applicatior, which can also be used for applying bitumastic coatings to finished a/c pipe, and which is essentially a long steel pipe having a rotating head (spinner) attached to the end, with feed and compressed air lines running inside the pipe. The latex feed is supplied from a container driven by compressed air. The feed line discharges the latex coating at the cone of the rotating head, where it is sprayed through small openings as small atomized droplets, onto the interior surface of the a/c pipe, or in the broadest embodiment, the fluid contacting a/c surface. Two casters attached to the pipe near the discharge end maintain the assembly centered within the pipe, while the applicator moves along the inside of the pipe, coating the entire interior surface.

In the broadest embodiment of the invention, an effective latex coating could be applied to the outside or, other desired part of the a/c article as well, using a desired applicator means.

The amount of coating applied to the a/c surface can be varied, of course, and it has been determined that about 2-20 mils, preferably about 3-6 mils of coating of pipe surface provides an effective protective covering. All references throughout made to coating thicknesses are finished, autoclaved thicknesses, not the greater thicknesses applied in the wet state. For example, it would be necessary to apply a coating about 10 mils thick in order to obtain a dried, autoclaved coating of 5 mils thickness.

The latex constituent of the invention is preferably selected from the group of styrene-butadiene latexes, most preferably, a latex marketed under the label "Goodrite 1800×73", a product of B. F. Goodrich Co., which is an unsaturated, modified styrene-butadiene latex. It contains a cure mechanism that is activated by heat at about 300° F., and is a non-carboxylated emulsion with a pH of 9.0, total solids content of 44.2%, and a surface tension of 70 dynes/cm.

However, other ingredients besides latex rubber are required for an effective protective coating. A latex without a vulcanizing agent which is applied to an a/c pipe would, after autoclaving, result in an elastic, soft rubber coating. A hard rubber coating can be produced by incorporating a vulcanizing agent, preferably sulfur, into the formulation. During autoclaving sulfur causes vulcanization, or cross-linking of the unsaturated latex particles and results in a hard rubber coating on the a/c surface. The precise amount of sulfur can vary between about 2 and 35 parts per 100 parts rubber, depending on the desired hardness of the coating.

An antioxidant is essential for preventing oxidative attack from heat, oxygen, ozone, sunlight and the like, by functioning so as to disturb the propagative cycle through the elimination of peroxides and hydroperoxides. A large number of antioxidants are available for rubber compounding; DPPD, or N, N' diphenyl-p-phenylenediamine, a low volatile antioxidant which is a product of the R. T. Vanderbilt Company, Norwalk, Conn., is the antioxidant of choice; however, others will be apparent to one skilled in the art.

Fillers are highly desirable, but not essential elements of the coating, since they are primarily added as cost reducing agents. A wide variety of fillers can be used, including carbon black, calcium silicate, precipitated calcium carbonate, silica, various clays, magnesium carbonate, zinc oxide, and the like while the amount of filler added can range from about 0 to 75 wt. % of the coating.

Two additional constituents are preferred, but not essential, in the coating. To overcome the tendency of the latex to foam during mixing, an antifoaming agent, most preferably a product sold under the trade name "Foamaster B", by Diamond Shamrock Co., Morristown, N.J. should be added. The second preferred constituent is a cellulose gum, or, carboxy methylcellulose, such as the one sold under the trade name "grade 7MF", a product of Hercules, Inc. of Wilmington, Del. The cellulose gum is added in order to increase the viscosity of the coating. Other viscosity increasing agents, usually depending on the particular quantity and type of filler added, can be substituted in place of cellulose gum. A dispersing agent, such as the product sold under the trade name, "Tamol 731", a product of Rohm and Haas, is required if it is desired to add a large amount of filler to the latex.

A preferred, but not critical part of the invention is that the latex composition be applied to the a/c surface after precuring but of course before the autoclaving step, in which the a/c articles are exposed to high temperatures and pressures in a saturated steam atmosphere. By the use of such a step in this order both vulcanization of the rubber and curing of the cement occur concurrently during autoclaving, and the coating becomes bonded to the a/c matrix. It is believed to be very surprising that a latex coating can both withstand the severe autoclaving conditions and also becomes bonded to the a/c surface.

EXAMPLE 1

"Polysar 995", a type 200 hot polymerized styrene-butadiene latex, is a product of Polysar, Ltd., Sarnia, Ontario, Canada. The latex is unsaturated, and noncarboxylated, having a pH of 10.8 and a surface tension of 51 dynes/cm. It contains a rosin acid emulsifier and a formaldehyde preservative.

Several 3×8 inch a/c "pats" or, small pieces of a/c sheets, were produced from a furnish in the laboratory comprised of 18.6 g 4T-3 chysotile, 4.7 g L-6 crocidolite 79.0 g Type I Portland cement, and 52.7 g silica flour. The fiber content of the furnish is 15% and the cement-:silica ratio is 1.5 to 1. 1000 cc's of filtered lime gypsum water was poured into a mixing cone, the blended dry ingredients were added and the resulting suspension first stirred, and then discharged into the filtering box. The slurry was filtered at 16 inch mercury vacuum for 4 minutes and the cake was pressed; upon completion, the resulting cake was transferred to a mold. The mold and press assembly were then placed into a Carver press and a pressure of 320 psi was applied to the cake. This entire procedure is very similar to the "sag test" used by the a/c industry for the evaluation of asbestos fibers in asbestos cement.

Several of the thus prepared pats were precured in a humidity cabinet for one hour at room temperature, however, most were precured at elevated temperatures equivalent to those found in industrial a/c precuring.

The latex was applied to the pat surface by using either pipettes, plastic droppers, simple pouring, or a spray gun. An a/c pat was precured in a humidity cabinet for one hour at room temperature, then coated with approximately 0.10 lbs/ft$^2$ of Polysar 995 latex (equivalent to about 0.05 lbs/ft$^2$ of dry latex) and then returned to the humidity cabinet and precured for an additional 24 hours. The coating had solidified during precuring, but was found to be still tacky. The pat was next autoclaved for 10 hours in a saturated steam atmosphere maintained at 350° F. and 135 psi. Upon removal, the autoclaved latex coating had lost its tackiness and exhibited a rubbery, elastic consistency, being bonded to the a/c surface. The coating additionally showed no ill effects from a 4 hour immersion in boiling water.

EXAMPLE 2

An a/c pat was precured for two hours at 170° F., instead of ambient temperature. The pat was next coated with Polysar 995 latex by applying an excessive amount of latex to the pat surface and decanting the excess after 5 minutes. The coated pat was then further precured for 4 hours at 170° F., whereupon it was then autoclaved for 10 hours @ 135 psi and 350° F. The finished, autoclaved coating had an excellent appearance, being clear, elastic, and well bonded to the a/c surface.

EXAMPLE 3

A second a/c pat was subjected to the same procedure as set forth in Example 2, with the further addition of 20 parts sulfur and 0.5 parts DPPD antioxidant per 100 parts rubber to the latex. The amount of coating applied on a dry basis was 0.075 lbs/ft$^2$, and the finished, autoclaved coating had an excellent appearance, being well bonded to the a/c matrix. No peeling, blistering, or other damage could be found. The addition of sulfur to the latex caused vulcanization of the rubber to occur, resulting in a hard, ebonite coating.

EXAMPLE 4

A latex sold under the trade name, "Butaprene PL-3131", a product of the Hooker Chemical Co. of Pottstown, Pa., was used as the latex constituent. PL-3131 is a saturated styrene-butadiene copolymer, with a total solids content of 47.7%, and a surface tension of 31 dynes/cm. The average particle size of the polymer is 0.2 microns and the pH of the suspension is 9.5. An a/c pat was precured for 1 hour in a humidity cabinet at room temperature, coated with 0.035 lbs/ft$^2$ of (dry) latex, further oven precured for 4 hours @ 180° F., and then autoclaved for 10 hours @ 135 psi and 350° F. The autoclaved coating was very strong, elastic, transparent and well bonded to the a/c surface.

EXAMPLE 5

The latex coating of Example 4 was applied to an a/c pat at a coat weight of 0.052 lbs/ft$^2$ of dry latex. The coated pat was precured at 190° F. for 4 hours, and then autoclaved as before. A few small cracks developed during precuring, but no further damage occurred during autoclaving.

EXAMPLE 6

"PL-3131" latex was mixed together with 105 parts silica flour per 100 parts of dry latex and applied to an a/c pat, followed by precuring at 175° F. in an oven for 4 hours. The coated, precured pat was then autoclaved. Upon completion, the cured coating was found to be glossy and semi-transparent.

EXAMPLE 7

"Goodrite 1800×73" latex, a product of B. F. Goodrich Co., is an unsaturated, noncarboxylated, modified styrene-butadiene latex. The pH of the emulsion is 9.0, total solids comprise 44.2%, and its surface tension is 70 dynes/cm. The product is essentially free of emulsifiers and approved under several FDA regulations. A thick (0.22 lbs/ft$^2$) coating of latex and DPPD antioxidant was applied to an a/c pat which has been exposed to an initial oven precure, a second precuring operation for 3 hours at 170° F., and then autoclaved for 10 hours at 135 psi. A few small cracks developed in the coating surface during precuring and were still present after autoclaving. The finished coating, however, was elastic and well bonded to the a/c surface.

EXAMPLE 8

The same latex composition as in Example 7 had sulfur introduced thereto, whereby the coating consisted of a composition having 100 parts latex rubber, 0.5 parts antioxidant and 20 parts sulfur. Coating, precuring and autoclaving conditions were identical to those in Example 7. During precuring a few small cracks developed, but the finished autoclaved coating displayed a hard, dark brown color having excellent adhesion to the a/c surface. The hardness of the ebonite coating, as well as the dark brown color, were the result of vulcanization with sulfur.

EXAMPLE 9

The coating from the preceeding example was given a silica filler, so that the coating now comprised 0.5 parts antioxidant, 20 parts sulfur, and 125 parts silica flour per 100 parts dry latex. An average coating weight of 0.170 lbs/ft$^2$ (dry) was applied to an a/c pat, and virtually no microscopic cracks or air bubbles were observed on the coating after precuring at 170° F. After autoclaving for 10 hours at 135 psi and 350° F., the coating exhibited a uniform appearance, and was very hard and well bonded to the a/c surface. No damage occurred after a prolonged exposure to boiling ing water, following the procedure of ASTM standard test C541-81.

EXAMPLE 10

An a/c pat was coated with the following latex composition:

| | |
|---|---|
| 1800 X 73 latex = | 100 parts |
| DPPD antioxidant = | 0.5 parts |

-continued

| | |
|---|---|
| Silica Flour = | 150 parts |
| Foamaster B = | 0.1 parts |
| 7 MF Cellulose Gum = | 0.15 parts |

This composition featured the addition of an antifoaming agent, "Foamaster B", as well as a cellulose gum for increasing the viscosity of the coating. The coating was applied to a steeply inclined pat surface while the pat was still warm from an initial oven precuring of 4 hours @ 180° F., and was further precured for 1 hour in an oven at 165° F. The precured coating exhibited a perfect appearance. The coated pat was next autoclaved for 10 hours at 140 psi and 350° F. Upon completion, the autoclaved coating exhibited a perfect appearance, and was well bonded to the surface.

EXAMPLE 11

A coating composition identical to that of Example 10 except that "N brand" sodium silicate, a product of the PQ Corporation, was substituted for cellulose gum as the thickening agent was subjected to the same processing. The finished autoclaved coating was hard and well bonded to the a/c pat.

EXAMPLE 12

The following coating:

| | Parts per 100 parts dry rubber | As is weight (grams) |
|---|---|---|
| Latex, Goodrite 1800 X 73 | 100 | 11,160 |
| Silica Flour | 100 | 5,000 |
| DPPD dispersion Antioxidant | 0.75 | 68 |
| Sulfur, dispersed | 20 | 1,470 |
| Antifoamer, Foamaster B | 0.15 | 7.5 |
| Thickener, Cellulose Gum | 0.36 | 800 |
| | | 18,605 gms | was mixed and applied to the interior surfaces of several 8-inch diameter, class 150, Type II a/c pressure pipe. The applicator was the industrial coating "spinner" applicator. The Brookfield viscosity of the coating was 1,600 cps. The a/c pipes were first precured for 2½ hours at 175° F., and then coated with the latex to an average thickness (dry) of about 3 mils. The coating solidified within about 10 minutes and felt dry to the touch. The coated pipes were next transferred to the autoclave unit after a 4 hour waiting period, which is standard industrial practice after precuring. The pipes were autoclaved for 16 hours at 145 psi, a longer period than the customary 12 hour autoclaving period for this type pipe. Upon completion, the pipes were extracted and cooled. A surface examination revealed that although the coatings were thin, the pipe surface was uniformly covered, being black in color. The coatings were hard, slightly brittle, but well bonded to the a/c surface.

EXAMPLE 13

A coating, identical in composition to that used in Example 12, was applied to the interior surface of an 8 inch diameter, class 150 a/c pipe immediately after extraction from the mandrel and before entering the secondary precure oven. As in the previous example, the pipe was spray coated using an industrial spinner type coating applicator. The residence time in the precure oven was 2½ hours at a temperature of 175° F. Upon leaving the precure oven, the coating was dry, uniform, and exhibited no cracks, blisters or other damage. The pipe was then autoclaved under the same conditions as described in Example 12. The autoclaved coating was hard and well bonded to the a/c pipe surface.

EXAMPLE 14

The same type a/c pipe used in Example 12 was coated with the identical latex coating, but without the inclusion of sulfur. Since Goodrite 1800×73 latex is heat reactive, i.e., vulcanizable without sulfur, so a coating having adequate hardness may be obtained without sulfur. The pipe was subjected to the same treatment as in Example 12, with an average coating of 3.5 mils being applied. The finished coatings were observed to be hard and well bonded to the surface, but not as hard as the sulfur containing coatings of Example 12. The coatings were also not as smooth and uniform.

EXAMPLE 15

A third set of a/c pipes were coated with the following sulfur containing latex composition:

| | Parts per 100 parts dry rubber | As Is Weight (grams) |
|---|---|---|
| Latex, Goodrite 1800 X 73 | 100 | 6,696 |
| Silica Flour | 100 | 3,000 |
| DPPD Antioxidant | 0.72 | 23 |
| Sulfur, Dispersed | 13.0 | 574 |
| Antifoamer, Foamaster B | 0.15 | 4.5 |
| Thickner, Cellulose Gum | 0.38 | 575 |
| | | 10,873 grms |

The Brookfield viscosity of the coating was 1360 cp. The pipes were precured, and while still warm were coated with an average coating of about 3 mils of the above composition. The coatings appeared to solidify within a short time after application, and were autoclaved for 16 hours at 355° F. and 145 psi. Upon completion and cooling, the autoclaved, vulcanized coatings were black in color, smooth, hard and well bonded to the a/c surface. Subsequent testing also showed an increase of close to 10% in the bursting strength of these pipes when subjected to the high pressure hydroburst test, following ASTM standard procedures, indicating that these coatings also improved the mechanical strength of the pipe.

Thus, it is seen that a latex rubber coating has been developed for a/c pipe that is resistant to leaching from aggressive waters and other similar fluids. The coating is easily applied to the pipe before autoclaving, so it can conveniently be incorporated into an industrial plant production operation. During autoclaving the latex becomes vulcanized into a hard rubber coating while also being bonded to the a/c surface. All of the ingredients have been approved by governmental agencies as safe for usage in such environments, and thus do not release any known toxins or carcinogens into the transported fluid, particularly drinking water.

I claim:

1. A process for the production of a latex coated asbestos-cement product comprising:
    forming the asbestos-cement product from an aqueous slurry of asbestos fibers, cement and silica on a means for forming a product of predetermined dimension;

removing the product from the means for forming a product;

coating the product with a latex composition comprising a styrene-butadiene copolymer to a predetermined thickness;

autoclaving the coated product for a predetermined time at a predetermined pressure and temperature in order to bond the latex composition to the cured asbestos-cement product;

cooling the product to a predetermined temperature.

2. A method as claimed in claim 1 wherein the asbestos-cement product is a pipe and the coating is applied to the interior surface thereof.

3. A method as claimed in claim 2 wherein the means for forming a product of predetermined dimension is a mandrel.

4. A method as claimed in claim 2 wherein the asbestos-cement pipe is precured for a predetermined time and temperature before autoclaving.

5. A method as claimed in claim 3 wherein the asbestos-cement pipe is precured for a predetermined time and temperature before removal from the mandrel, removed from the mandrel, and precured for a second predetermined time and temperature before autoclaving.

6. A method as claimed in claim 4 wherein the asbestos-cement pipe is precured for a predetermined time and temperature before removal from the mandrel, removed from the mandrel, and precured for a second predetermined time and temperature before autoclaving.

7. A method as claimed in claim 2 wherein the latex coating comprises an unsaturated styrene-butadiene latex, a vulvanizing agent, an antioxidant and a filler.

8. A method as claimed in claim 2 wherein the latex coating thickness ranges from about 2 to 20 mils.

9. A method as claimed in claim 2 wherein the coated pipe is autoclaved for about 8-16 hours at about 130-160 psi and about 345°-375° F.

10. A method as claimed in claim 2 wherein the pipe is cooled to room temperature after autoclaving.

11. A method as claimed in claim 1 wherein the styrene-butadiene copolymer is unsaturated.

12. A method as claimed in claim 11 wherein the latex composition contains a vulcanizing agent, which composition upon autoclaving, forms a hard protective coating which is bonded to the asbestos-cement product.

* * * * *